United States Patent [19]

Thiel et al.

[11] 4,168,773

[45] Sep. 25, 1979

[54] BOTTLE LABELING MACHINE WITH TURNTABLE HAVING RESILIENTLY URGED CLAMPING JAWS

[75] Inventors: Dieter Thiel, Holzen; Peter Weber, Heiligenhaus; Jürgen Winsberg, Dusseldorf, all of Fed. Rep. of Germany

[73] Assignee: Jagenberg-Werke Aktiengesellschaft, Dusseldorf, Fed. Rep. of Germany

[21] Appl. No.: 891,871

[22] Filed: Mar. 30, 1978

Related U.S. Application Data

[63] Continuation of Ser. No. 726,361, Sep. 24, 1976, abandoned.

[30] Foreign Application Priority Data

Oct. 3, 1975 [DE] Fed. Rep. of Germany ....... 2544278

[51] Int. Cl.[2] .............................................. B65G 47/86

[52] U.S. Cl. .................................... 198/479; 198/377; 198/480

[58] Field of Search ............... 198/344, 377, 378, 478, 198/479, 480, 481, 653, 694

[56] References Cited

U.S. PATENT DOCUMENTS

| | | | |
|---|---|---|---|
| 1,833,417 | 11/1931 | Drake | 198/378 |
| 3,058,568 | 10/1962 | Rudzinat | 198/478 |
| 3,568,851 | 3/1971 | Schafer | 198/694 X |
| 3,975,260 | 8/1976 | Peyton et al. | 198/479 X |

FOREIGN PATENT DOCUMENTS

| | | | |
|---|---|---|---|
| 665506 | 1/1952 | United Kingdom | 198/480 |
| 279428 | 11/1970 | U.S.S.R. | 198/479 |

*Primary Examiner*—Robert B. Reeves
*Assistant Examiner*—James L. Rowland
*Attorney, Agent, or Firm*—Sprung, Felfe, Horn, Lynch & Kramer

[57] ABSTRACT

A bottle labeling apparatus is provided in known manner with a turntable for picking up bottles at one location and delivering them elsewhere. The turntable has a plurality of rotary heads at its perimeter, the heads rotating regularly during a part of their cycle but being accelerated or retarded during the pickup and delivery operations by means of a cam and follower. Each rotary head carries a clamp comprising a pair of resiliently urged jaws for picking up and releasing a bottle when the axis of the bottle at the pickup and discharge stations, respectively, lies within the plane of symmetry of the clamp jaws.

4 Claims, 3 Drawing Figures

BOTTLE LABELING MACHINE WITH TURNTABLE HAVING RESILIENTLY URGED CLAMPING JAWS

This is a continuation of application Ser. No. 726,361, filed Sept. 24, 1976, now abandoned.

The invention relates to a turntable for articles to be provided with labels, especially for bottles to be provided with foil labels at their necks, with one or several rotary heads each having a holding clamp, which are arranged on the turntable eccentrically to its axis of rotation and which revolve around their own axes. The clamps receive bottles from a rotary plate holding them in suitable recesses, and deliver the bottles to a rotating delivery element provided with suitable recesses in its outer periphery.

In a known device of this kind a drive is provided for each clamp to open the jaws during the passing of the feed element to receive the bottle and then closes the jaws for the torsion-free holding of the bottle until the bottle arrives in the vicinity of a pickup element, as the bottle revolves around its own axis in an arcuate path during which it is provided with the foil label. Within the operating range of the pickup element the drive opens the jaws of each clamp for delivery of the bottle to the pickup element. In this apparatus, the need for clamp jaws, the means for their opening and closing, and their rotation is costly and disadvantageous.

The invention is addressed to the problem of producing a rotary plate wherein the clamps are formed more simply.

This problem is solved according to the invention by a turntable of the kind mentioned hereinabove wherein the wedge grips of the clamps are spreadable against an elastic force and have a rotational control which at least in the initial phase of the insertion of a bottle between the wedge jaws, aligns the plane of symmetry between the jaws with the axis of the bottle in such a manner that the axis lies in such plane of symmetry.

With the rotary plate according to the instant invention the clamps require no drive of their own for the opening of the jaws. The transport of the objects from the domain of the delivery element into the area between the clamps presents no problems since the bottle engages both jaws simultaneously so that the jaws spread uniformly.

Although the removal of a bottle from the clamp jaws is less critical than the insertion, according to an embodiment of the invention a rotating steering mechanism can align the bottles accordingly during their removal from the clamps so that the axis of the respective receiving station will lie in the plane of symmetry of the jaws.

According to a first alternative, the jaws of each clamp can be loaded by a spring. According to a second alternative, the jaws of each clamp can consist of a piece of rubber-elastic material.

In order to meet the requirement of an asymmetrical rotary movement during receiving of bottles and in some cases delivering the bottles by a rotating steering mechanism which is as simple as possible, each clamp can be provided with a cam track and a cam follower. preferably, a fixed toothed segment is disposed in the region lying outside of the receiving and preferably also of the delivery area, the rotary head with the clamp rolling along the segment in the manner of a planetary gear, whereas within the receiving and preferably in the delivery area of the rotary motion only the cam track and the cam follower are provided.

The invention will now be further described with reference to the accompanying drawings, wherein.

Figure 1:
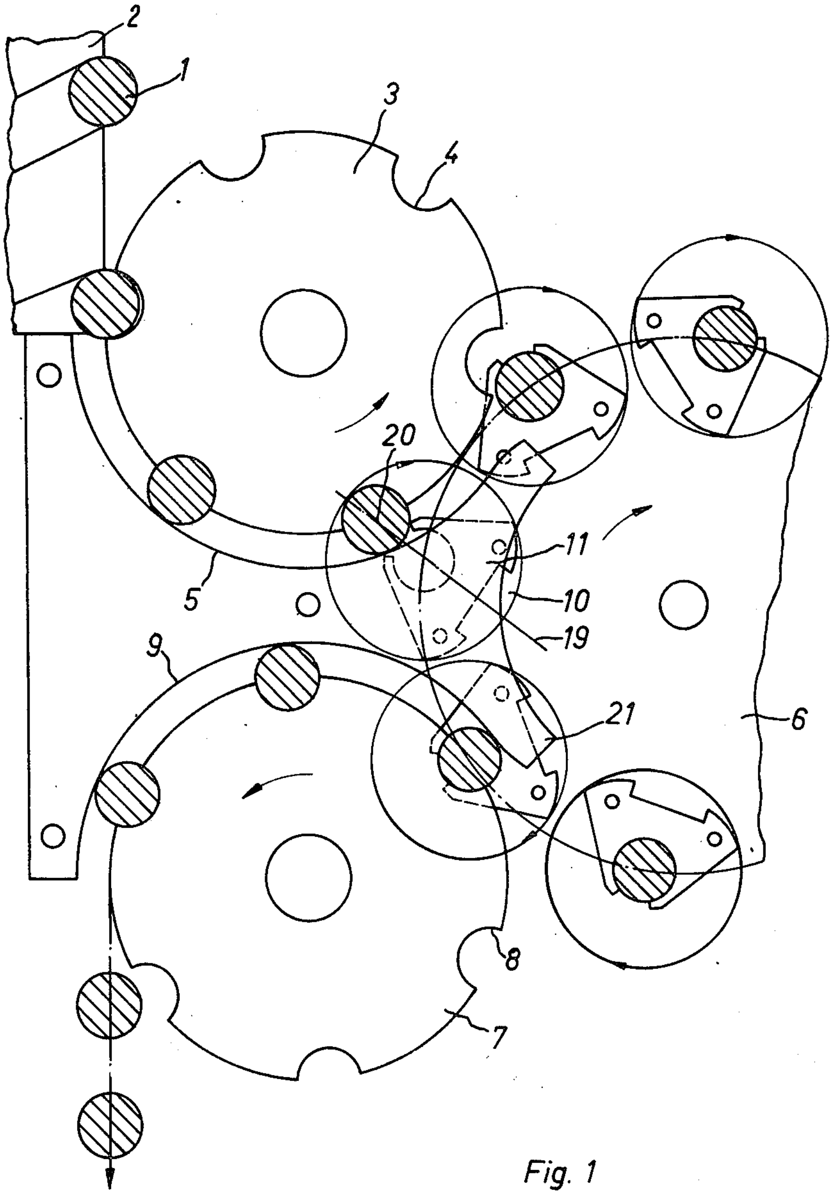
FIG. 1 is a diagrammatic top plan view of a turntable with delivery element prearranged in conveying direction and with a subordinately placed pickup element.
Figure 3:
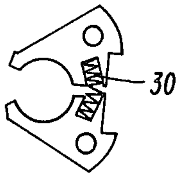
FIG. 3 is a top view of a clamp having a spring bias.
Figure 2:
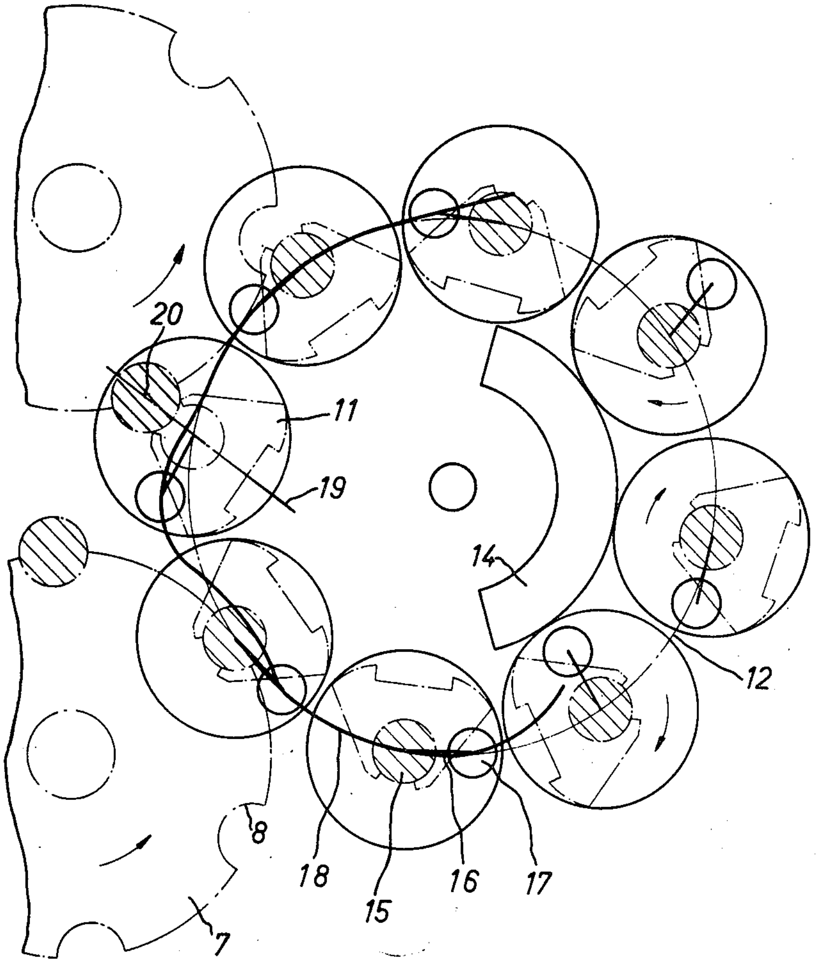
FIG. 2 is a diagrammatic top plan view of the device according to FIG. 1 showing the drive elements for the rotary heads and jaw clamps.

Referring now more particularly to FIG. 1, the bottles 1 to be provided with labels at neck and belly arrive by means of a spacing device 2 in the vicinity of a plate-shaped delivery element 3 which has spaced receiving points 4 arranged about its outer circumference for receiving the bottles 1. During the transport of the bottles by the delivery element 3 the bottles are kept at the outwardly open receiving points 4 by a convexly curved guide 5. The bottles 1 arrive from the delivery element 3 at the turntable 6, described in detail hereinbelow, which delivers it along an arcuate path to a plate-shaped pickup element 7 which, like the delivery element 3, on its outer periphery has spaced, outwardly open receiving points 8 for the bottles 1. Within the transporting range of the bottles 1 there is provided for the pickup element 7 a corresponding, curved outer guide 9 which maintains the bottles 1 within the receiving points 8. The bottles leaving the pickup element 7 are removed by a conveyor belt, not shown.

The turntable 6 is provided with a plurality of rotary heads 10 arranged eccentrically to the axis of the turntable and each carrying a clamp 11 comprising a one-piece block of rubber-elastic material or a jaw biased by spring 30. The axis of the receiving points for the bottles 1 formed by the jaws of the clamp coincides with the axis of rotation of the rotary head 10. As the turntable 6 rotates, the rotary heads move along an arcuate path 12, while they also turn around their own axes. The directions of rotation of the turntable 6 and of the rotary heads 10, as well as of the delivery element 3 and the pickup element 7, are shown in the drawing by arrows. A free-standing toothed segment 14 is provided for the proper rotation of the rotary heads 10 in a first rotating range which interacts with a cogwheel, not shown, of the rotary head 10 in the manner of a planetary gearing. In the area lying outside of the toothed segment 14, the proper rotation takes place by means of a feeler 17 shaped as roll, which is connected to the axis 15 of the rotary head 10 by a lever arm 16. As soon as the rotary head 10 with its cogwheel leaves the toothed segment 14, the feeler 17 arrives at a grooved cam track 18 which ensures that the rotation of the rotary head is continued, however, no longer uniformly but asymmetrically. The shape of the track 18 is such that the plane of symmetry 19 between the jaws of the clamp 11 coincides with the axis 20 of the bottles in the bottle receiving area as well as in the delivery area during the entire receiving and delivery phase. Thereby during the receiving the jaws of the clamp 11 are uniformly loaded and spread evenly, whereby a trouble-free delivery is ensured by a simple apparatus. By the suitable coordination of the plane of symmetry 19 to the axis of the delivery points of the pickup element 7, there is achieved an easier removal of the bottles by means of a switch 21 which is prearranged at the side guide bearing 9 and reaches up to the reqion of the rotary plate 6 behind the receiving points of the clamp 11.

While the bottles are held in the jaw clamps they may be labeled, wrapped or otherwise worked upon in known manner.

It will be appreciated that the instant specification and examples are set forth by way of illustration and not limitation, and that various modifications and changes may be made without departing from the spirit and scope of the present invention.

What is claimed is:

1. In an apparatus for bottles to be provided with labels and comprising a turntable, at least one rotary head arranged on the turntable eccentrically to its axis of rotation, wherein the improvement comprises a clamp on each rotary head for picking up a bottle as the clamp moves past a rotating pickup element and for delivering the bottle when moving past a delivery element wherein both the pickup and delivery portions of the turntable cycle for each clamp is less than the complete turntable cycle, a pair of jaws on the clamp spacable against an elastic force to embrace a bottle therein and means for rotating the rotary head at least one complete revolution about its own axis for each revolution of the turntable to align the plane of symmetry of the jaws so that the axis of the bottle lies in such plane of symmetry when the bottle is picked up and delivered by the clamp, said means comprising a single stationary cam track, a cam follower operatively connected to each rotary head and engageable with the cam track only during the pick up and delivery portion of the turntable cycle for the corresponding clamp, to impart asymmetrical rotation to the rotary head, stationary gear means and cooperating gear means connected to each rotary head and engageable with the stationary gear means only when the associated clamp is outside of the pick up and delivery portions of the turntable cycle to impart symmetrical rotation to the rotary head.

2. An apparatus according to claim 1, wherein the force loading the jaws of each clamp is a spring.

3. An apparatus according to claim 1, wherein the jaws of each clamp consist of one piece of rubber-elastic material, the elasticity constituting the loading force.

4. An apparatus according to claim 1, wherein the stationary cam track is an open non-circular arc and extends around less than the whole circular path of each clamp during its revolution on the turntable and the stationary gear means has the shape of a circular arc and is disposed in the vicinity of the path of each clamp where the stationary cam track is not present.

* * * * *